(12) United States Patent
Hutter

(10) Patent No.: US 7,830,533 B2
(45) Date of Patent: Nov. 9, 2010

(54) PAPER UI METHOD AND TOOLS

(75) Inventor: Robert Hutter, Brighton, NY (US)

(73) Assignee: Xerox Corporation, Norwalk, CT (US)

(*) Notice: Subject to any disclaimer, the term of this patent is extended or adjusted under 35 U.S.C. 154(b) by 1358 days.

(21) Appl. No.: 11/314,037

(22) Filed: Dec. 20, 2005

(65) Prior Publication Data

US 2007/0139725 A1 Jun. 21, 2007

(51) Int. Cl.
*G06F 3/12* (2006.01)
*G06K 15/00* (2006.01)

(52) U.S. Cl. .............. 358/1.13; 358/1.12; 358/1.18; 382/100

(58) Field of Classification Search .......... 358/464, 358/474, 1.1, 1.12, 1.13, 1.15–1.18, 1.9; 382/100, 317; *G06F 3/12; G06K 15/00*
See application file for complete search history.

(56) References Cited

U.S. PATENT DOCUMENTS

| | | | |
|---|---|---|---|
| 6,563,598 B1 * | 5/2003 | Johnson et al. | 358/1.15 |
| 6,833,927 B2 | 12/2004 | Gusmano et al. | |
| 7,286,682 B1 * | 10/2007 | Sharma et al. | 382/100 |
| 2005/0129283 A1 | 6/2005 | Butler et al. | |
| 2006/0045600 A1 * | 3/2006 | Lugg | 400/578 |

OTHER PUBLICATIONS

Seybold Publications, Seybold Report on Desktop Publishing, vol. 9, No. 5, Xerox Touts DataGlyphs for Paper Data, 1996.

* cited by examiner

*Primary Examiner*—James A Thompson
(74) *Attorney, Agent, or Firm*—Ronald E. Prass, Jr.; Prass LLP

(57) ABSTRACT

A machine readable instruction sheet for scanning along with a document. The machine readable instruction sheet is generally placed on top of the document prior to scanning. The machine readable instruction sheet includes at least two sets of distinct machine readable markings. Each of the at least two sets of distinct machine-readable markings include instructions for tasks.

15 Claims, 4 Drawing Sheets

PAPER UI METHOD AND TOOLS

The embodiments disclosed herein are directed to document scanning and more specifically to a method for producing multiple outputs of a scanned document.

The widespread availability of optical scanners, facsimile (fax) machines, multifunction devices, and other devices and subsystems by which computers and computer networks can "read" paper documents has given rise to the concept of a paper-based user interface. A paper-based user interface allows the user of a computer, computer network, or other digital information processing system to communicate with the system simply by making a mark or marks on a paper document or documents and then scanning the document thus marked into the system via a scanner, fax machine, multifunction device, or the like.

A paper-based user interface can serve as a complement or substitute for the more conventional keyboard-mouse-display type of user interface mentioned earlier. A paper-based user interface is particularly appealing when the user interacts with a computer network directly through a multifunction device, without recourse to a personal computer or workstation. In this situation, the user can initiate a number of functions, such as document copying, facsimile, electronic mail, document storage, and search using a simple paper form as an interface. The multifunction device "reads" what is on the form and responds accordingly, possibly with help from the network.

Paper-based user interfaces typically require that forms be created in advance, either by the user with a form editor or automatically by computer, so that the receiving computer can readily determine whether and where a given form has been marked by a user. For example, specially coded information, such as a pattern of data glyphs or a bar code, can be included in the form itself to indicate the instructions to the device. The device (or a computer networked to the device) can be programmed in this case to seek the coded information at a predesignated location within the received image, and to use the coded information together with additional (stored or preprogrammed) information to determine what is to be done.

In particular, exemplary paper-based user interfaces are known that allow a user to designate what happens to a scanned version of a hard copy document. FlowPort™ is one such system. The user accesses a website where the user creates a cover sheet for the scan job. The cover sheet includes markings called glyphs that contain instructions regarding the document to be scanned. These instructions can include, but are not limited to, what format the scanned document will take and to where or who the document will be sent. For example, when a FlowPort™ user scans a document using a "Scan to Myself" cover sheet, the document is scanned to the user's e-mail address.

Further, regardless of whether a user wishes to print a physical copy of a document, the user may want to take different actions with respect to different documents. A user may have multiple documents they want to scan. Once scanned, the user may want to send different documents to different locations or they may want to print copies of some and not others, etc. Using machine readable instruction sheets with one machine-readable area means generating new sheets every time the desired output or outputs changes. Even where the document cover sheet includes user-selectable features (see the check boxes 115 in FIGS. 1 and 2), a user would need to print a new sheet or erase marks from an old sheet each time the function of the sheet was changed. It would be desirable to have one sheet that could be used for multiple individual functions without modification.

Embodiments include a machine readable instruction sheet with multiple distinct machine-readable areas that could be read by the control system of a multifunction device, wherein each area includes a set of instructions and no two sets of instructions are the same. "Distinct" as used with respect to the machine-readable areas means that at the very least the machine-readable areas do not overlap. The device can be made to only read the portion of the machine readable instruction sheet that is face-up and away from the user when the sheet is placed into a sheet feeder. In this way a single machine readable instruction sheet can provide multiple instruction sets for scanning, depending only on the orientation of the machine readable instruction sheet. Different orientations of one sheet can allow a user to select one of, for example, (a) scan to myself; (b) scan to myself and make a copy; (c) scan to myself, make a copy, and staple the copy; or (d) scan into a workflow system and make a copy.

Various exemplary embodiments will be described in detail, with reference to the following figures.

A printing device as used herein refers to any device that produces visible marks on paper. Printing devices include, for example, copiers, printers, or multi-function devices. Paper as used herein refers to any markable media such as, for example, paper, plastic, and textile materials.

A copying device is any device capable of scanning and locally producing a copy of a document, regardless of whatever other features the device may have.

A multi-function device or multi-function scanning device is any device that includes a scanner and a plurality of output options (e.g., copying, printing, electronic transmission).

A document as referred to herein includes one or more pages of printed paper or pages to be printed.

Figure 5:
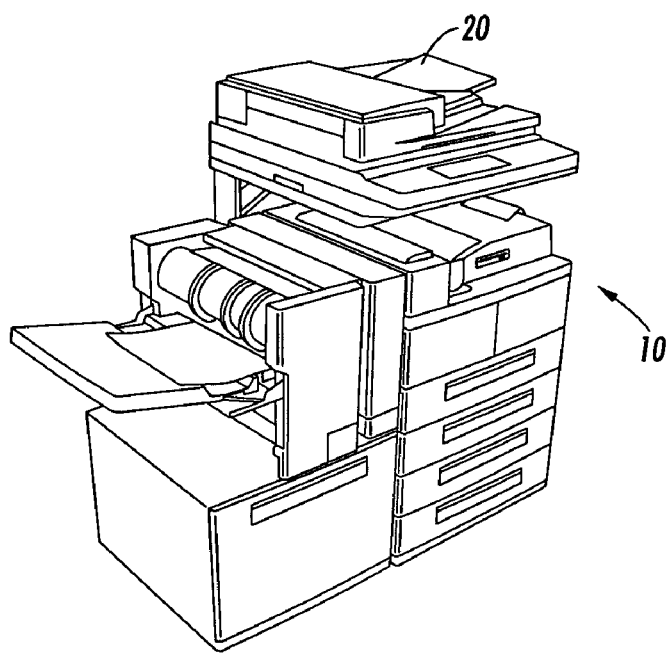
FIG. 5 is a schematic illustration of an exemplary printing device with scanner input.
Figure 6:
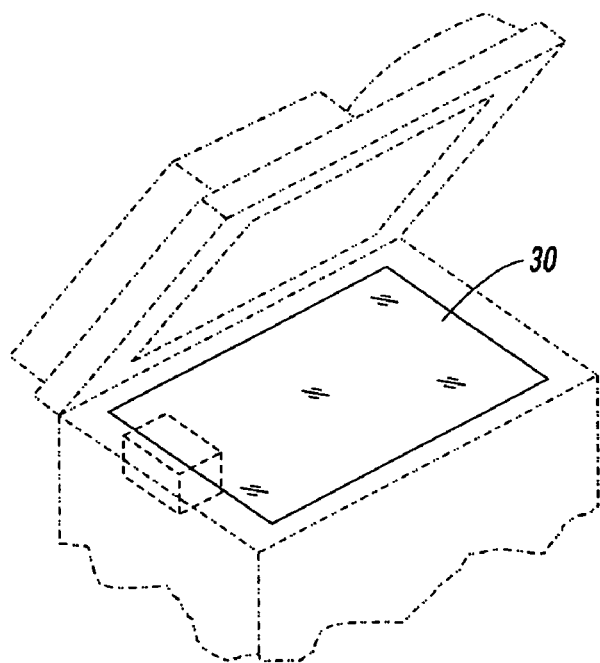
FIG. 6 is an exemplary, schematic illustration of a scanner attached to a printing device.

FIG. 5 is a schematic illustration of a multi-function device 10 with a document handler 20 into which documents to be copied are inserted to be fed to a scanning device. The device 10 can produce local copies of a scanned document among other functions. FIG. 6 shows a schematic image of a platen 30 of a scanner that would be part of the device 10. To produce copies, documents are placed on platen 30 and scanned. The front of platen 30 is the portion that is closest to the user making a copy. The rear of the platen 30 is the portion of the platen farthest from the user. The document handler 20 would feed sheets to the platen where they would be scanned.

Figure 1:
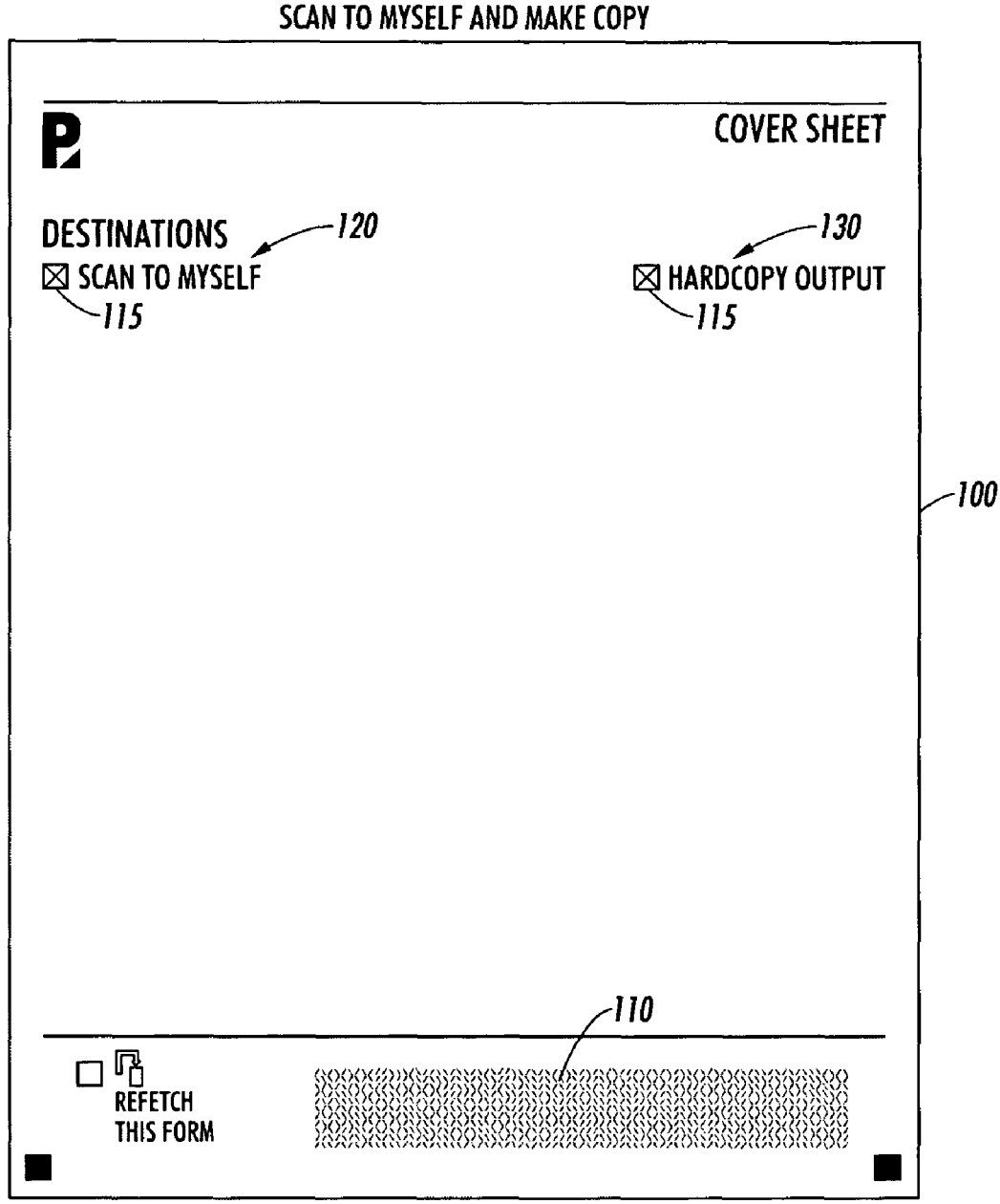
FIG. 1 shows a first exemplary embodiment of a machine readable instruction sheet.

FIG. 1 illustrates an exemplary embodiment of a machine readable instruction sheet 100 for a paper-based UI system. A user would place the machine readable instruction sheet 100 on top of a document and then place both it and the document into the document handler 20. When the device 10 scans in the document along with machine readable instruction sheet 100, the device, or a computer operably connected to the device either directly or through the network, reads the information present on the face of machine readable instruction sheet 100 and processes the document according to that information. The information is usually embedded within machine readable information 110 printed on the face of the machine readable instruction sheet 100. That information may contain the computer instructions themselves or it may contain an electronic address and a form identification code where the scanned data is sent to the address and the information thereon is interpreted depending on which form code was embedded. There are, of course, other systems possible.

Figure 2:
FIG. 2 shows a second exemplary embodiment of a machine readable instruction sheet.

In the illustrated embodiment, the machine readable information 110 is in the form of glyphs. In this case, the form 100 uses the glyphs 110 to convey instructions to the multifunction device 10 or to an attached computer regarding the document. While glyphs are shown, other machine readable means of conveying information, such as bar codes, may be used as well. FIG. 2 illustrates a paper UI cover sheet 200 having machine readable information in the form of a bar code 210.

Machine readable instruction sheets 100 are used to instruct the device scanning the sheet on what tasks to perform upon scanning the accompanying document. For example, the machine readable instruction sheet 100 may instruct the device to send a copy to the user's email address, multiple email addresses, or a database. Machine readable instruction sheet 100 includes a machine-readable portion 110. FIG. 2 also illustrates an alternative machine-readable sheet 200 with a machine-readable area 210. The machine-readable areas 110, 210 can also include instructions to print a copy of a document locally in addition to other instructions.

The form 100 can include a number of different user selectable features. Shown in FIG. 1 are "SCAN TO MYSELF" 120 and "HARDCOPY OUTPUT" 130. In embodiments, next to each user selectable feature is an empty box 115 that the user may select. The boxes 115 could be manually checked or automatically checked by the device when the form was originally generated. For example, users may generate paper UI coversheets at a remote location on a PC or other device where the user would select desired features before printing the form. However, a series of generic forms such as the form 100 may be generated with a list of common selections the user may make. When the sheets are generated, the instructions for what to do with an associated document are generally contained in the machine-readable portion 110.

In embodiments, the descriptions and check boxes merely inform the user what instructions are present on a particular sheet 100. In other embodiments, these checkboxes 115 could also be read by the printing device to determine what to do with a scanned document. In other words, the machine readable instructions could include the checked boxes. Conceivably the machine readable instruction sheet 100 could contain an array of every possible desired combination of outputs and the user would simply select which outputs s/he wants by checking the adjacent checkbox.

The user selectable features shown on sheet 100 are non-exhaustive and a variety of others could be easily and immediately contemplated. The machine readable information sheet 100 could include other features such as, for example, a listing of potential email recipients, a plurality of subject lines for any email sent, a plurality of databases into which the data may be stored, a plurality of remote networked printers to which the document may be sent, or an internet fax address to which the document may be sent.

Figure 4:
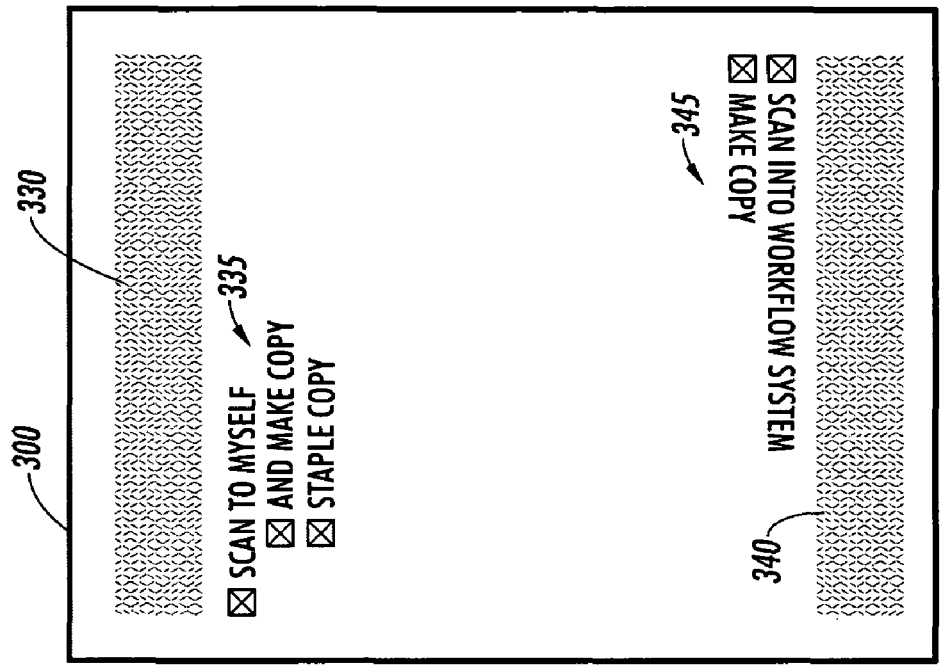
FIG. 4 shows a fourth exemplary embodiment of a machine readable instruction sheet.
Figure 3:
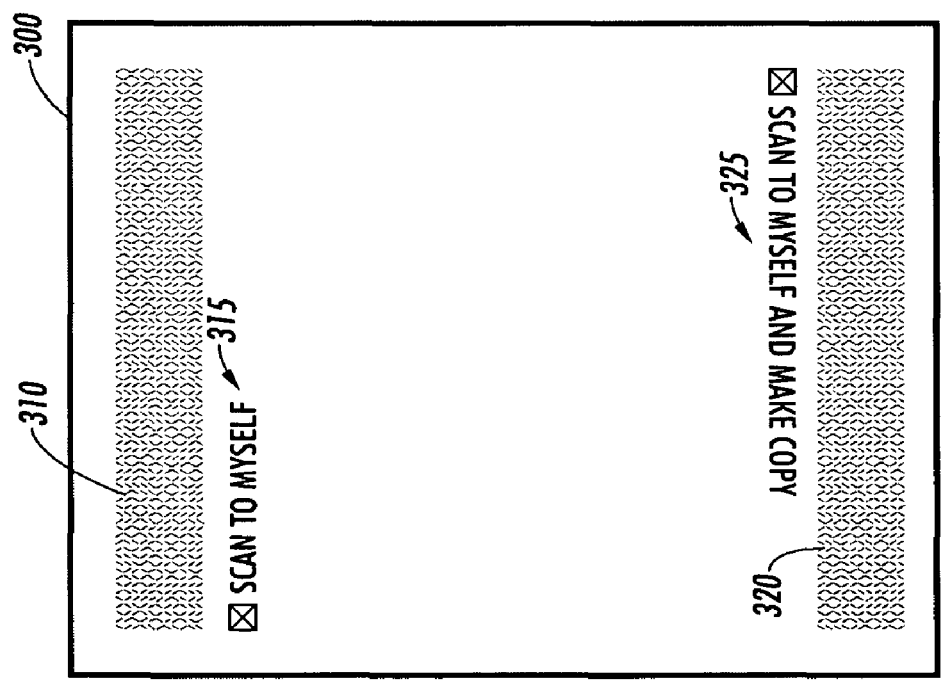
FIG. 3 shows a third exemplary embodiment of a machine readable instruction sheet.

FIGS. 3 and 4 illustrate the front and back of a multi-function document cover sheet 300. Sheet 300 includes four marked areas 310, 320, 330, and 340. Each area includes instructions for "actions" or sets of actions (for example, copying, scanning, entering into a workflow, finishing the copy, or any combination of these).

In embodiments, the marked areas 310, 320, 330, and 340, are located at the front-top, front-bottom, back-top, and back-bottom of sheet 300 respectively. This arrangement provides a relatively simple way to limit the printing device to following one set of instructions.

For example, when using the cover sheet 300 with a digital copier 10, the user takes his hard-copy original and places the cover sheet 300 on top of the first page of the original. To select one of the four possible actions, the user would place the cover sheet so the desired action is face up and right-side up on the top of the originals. The user would then place the document and cover sheet 300 into the document handler 20. Then the user pushes a "start" button on the copier, preferably without having to specify to the UI whether he is doing a scanning or copying job—the machine should be able to figure that out from reading the cover sheet.

When the digital copier runs the cover sheet and the originals through the document handler 20, the copier 10 looks at and "obeys" only the instruction set (embedded in machine-readable code) that is at the top of the front side of the cover sheet; the other three instruction sets are ignored. To change which instruction set the device 10 follows, the user merely rotates the cover sheet 300 180° or flips the cover sheet 300 over. For different desired actions at different times, the user just places the same cover sheet over the originals at different orientations: whatever instruction set is "right-side-up" relative to the original, is the instruction set that will be carried out. Alternatively, the device could be programmed to only read a machine readable area in a particular location upon scanning, or it could be programmed to follow only the instructions in the first machine readable area it scans. If either the latter methods are used, the instruction sets do not necessarily have to be oriented 180° apart. Similarly, instructions could be encoded into each machine-readable area that order the device not to read any other areas. The orientation of the cover sheet could still determine which instruction set to file.

In addition to the glyphs or other machine-readable code containing each set of instructions, sheet 300 may include text identifying which actions are encoded into each marked area. For example, area 310 includes "Scan to myself" 315, area 320 includes "Scan to myself and make a copy" 325, area 330 includes "Scan to myself, make a copy, and staple the copy" 335, and area 340 includes "Scan into a workflow system and make a copy" 345.

In the embodiment shown in FIGS. 3 and 4, each machine readable area is placed in one of four positions. Two positions are located on each side, with one machine readable area on each side printed upside down from the bottom edge on the single sheet. The particular configuration shown in FIGS. 3 and 4 has a symmetry that can be exploited for selection purposes. However, other arrangements could be used. While sheet 300 has four marked areas 310, 320, 330, and 340, the sheet could contain fewer or more marked areas with instructions. There could simply be two on one side as shown in FIG. 3 or three with one of the machine-readable areas on the second side. More areas could be added as well. Instructions could be written along all four edges of a sheet of paper and the instructions followed would depend upon how the paper was fed into the printing device. If more sets of instructions are added, a method for selecting which set of instructions the scanning device follows would need to be created.

While the present invention has been described with reference to specific embodiments thereof, it will be understood that it is not intended to limit the invention to these embodiments. It is intended to encompass alternatives, modifications, and equivalents, including substantial equivalents, similar equivalents, and the like, as may be included within the spirit and scope of the invention. All patent applications, patents and other publications cited herein are incorporated by reference in their entirety.

The invention claimed is:

1. An apparatus for scanning a machine readable instruction sheet along with a document, the machine readable instruction sheet comprising at least four sets of distinct machine readable markings, comprising:
   a document handler that receives and feeds the machine readable instruction sheet; and
   a scanner that scans the machine readable instruction sheet and reads one of the at least four sets of distinct machine readable markings,
   wherein each of the at least four sets of distinct machine-readable markings include computer-implementable instructions for completing automated tasks and the machine readable instruction sheet includes first and second sets of distinct machine readable markings on a first side of the sheet and third and fourth sets of distinct machine readable markings on the second side of the sheet,
   wherein the second set of instructions is oriented 180° relative to the first set of instructions and the fourth set of instructions is oriented 180° relative to the third set of instructions,
   wherein the apparatus converts one of the at least four sets of distinct machine readable markings to computer-implementable instructions based on the orientation of the machine readable sheet as it is scanned by the scanner and completes the automated tasks in accordance with the computer-implementable instructions.

2. The apparatus for scanning a machine readable instruction sheet of claim 1, wherein each set of instructions is different from every other set of instructions.

3. The apparatus for scanning a machine readable instruction sheet of claim 1, wherein the first and third sets of distinct machine readable markings are located near the top of the machine readable instruction sheet and the second and fourth sets of distinct machine readable markings are located near the bottom of the machine readable instruction sheet.

4. The apparatus for scanning a machine readable instruction sheet of claim 1, wherein the apparatus follows the instructions included in the machine-readable markings face up and closest to the top of the machine readable sheet when the sheet is placed in a document handler.

5. The apparatus for scanning a machine readable instruction sheet of claim 1, wherein the machine readable markings include glyphs.

6. The apparatus for scanning a machine readable instruction sheet of claim 1, wherein at least one of the sets of the machine readable markings includes instructions to send an electronic copy of the document to a recipient.

7. The apparatus for scanning a machine readable instruction sheet of claim 1, wherein at least one of sets of the machine readable markings includes instructions to produce a hard copy of the document.

8. A method comprising:
   receiving a document along with the machine readable instruction sheet in a document handler of a multi-function device, wherein the machine readable instruction sheet comprises at least four sets of distinct machine readable markings;
   receiving a signal to activate a scanning mechanism of the multi-function device;
   scanning the machine readable instruction sheet;
   reading one of the at least four sets of distinct machine readable markings on the machine readable instruction sheet,
   wherein each of the at least four sets of distinct machine-readable markings include computer-implementable instructions for completing automated tasks and the machine readable instruction sheet includes first and second sets of distinct machine readable markings on a first side of the sheet and third and fourth sets of distinct machine readable markings on the second side of the sheet,
   wherein the second set of instructions is oriented 180° relative to the first set of instructions and the fourth set of instructions is oriented 180° relative to the third set of instructions,
   converting the one of the at least four sets of distinct machine readable markings to computer-implementable instructions based on the orientation of the machine readable sheet as it is scanned by the scanner; and
   completing the automated tasks in accordance with the computer-implementable instructions.

9. The method of claim 8, wherein the instructions for tasks included in the machine readable markings that the multi-function device will follow is dependent upon the orientation of the machine readable instruction sheet relative to the document handler.

10. The method of claim 8, wherein the machine readable markings includes glyphs.

11. A method comprising:
   scanning a document along with a machine-readable instruction sheet, wherein the instruction sheet has at least four sets of machine readable markings that each include a discrete set of computer-implementable instructions for completing automated tasks and the machine readable instruction sheet includes first and second sets of distinct machine readable markings on a first side of the sheet and third and fourth sets of distinct machine readable markings on the second side of the sheet;
   wherein the second set of instructions is oriented 180° relative to the first set of instructions and the fourth set of instructions is oriented 180° relative to the third set of instructions,
   selecting one set of the at least four sets of machine readable markings based on the orientation of the machine readable sheet as it is scanned by the scanner;
   converting the one set of the four sets of distinct machine readable markings to computer-implementable instructions; and
   following the computer-implementable instructions contained in the selected at least one set of machine readable markings to complete the automated tasks.

12. The method of claim 11, wherein the machine readable markings include glyphs.

13. The method of claim 11, wherein following the instructions includes sending an electronic copy of the document to a recipient.

14. The method of claim 11, wherein following the instructions includes producing a hard copy of the document.

15. The method of claim 11, wherein each set of instructions is different from every other set of instructions.

* * * * *